US006944484B2

(12) United States Patent
Yasuda

(10) Patent No.: US 6,944,484 B2
(45) Date of Patent: Sep. 13, 2005

(54) MOBILE COMMUNICATION TERMINAL WITH CONTROL SECTION FOR ONE-WAY COMMUNICATION

(75) Inventor: Takahiko Yasuda, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/180,455

(22) Filed: Jun. 27, 2002

(65) Prior Publication Data

US 2003/0003947 A1 Jan. 2, 2003

(30) Foreign Application Priority Data

Jun. 28, 2001 (JP) ....................................... 2001-196455

(51) Int. Cl.[7] .............................................. H04M 1/00
(52) U.S. Cl. .............................. 455/575.3; 455/569.1; 455/350; 379/433.02; 379/433.13
(58) Field of Search ........................ 455/575.1, 575.3, 455/575.4, 90.3, 569.1, 560.1, 347, 348, 350, 351; 379/433.01, 433.02, 433.11, 433.12, 433.13, 433.03

(56) References Cited

U.S. PATENT DOCUMENTS

| 5,673,314 A | * | 9/1997 | Olkoski et al. | ......... 379/433.02 |
| 6,104,808 A | * | 8/2000 | Alameh et al. | ......... 379/433.02 |
| 6,359,984 B1 | * | 3/2002 | Kim | ....................... 379/433.02 |
| 6,389,267 B1 | * | 5/2002 | Imai | ........................... 455/90.1 |
| 2003/0003947 A1 | * | 1/2003 | Yasuda | ...................... 455/550 |

FOREIGN PATENT DOCUMENTS

| CN | 1243375 | | 2/2000 | ............ H04M/1/02 |
| JP | 11-68899 | | 3/1999 | ............ H04M/1/02 |
| JP | 11-88483 | | 3/1999 | ............ H04M/1/02 |
| JP | 11-068899 | * | 3/1999 | ............ H04M/1/02 |
| JP | 11-088483 | * | 3/1999 | ............ H04M/1/02 |
| JP | 11-187098 | * | 7/1999 | ............ H04M/1/02 |

OTHER PUBLICATIONS

"Notification of the First Office Action" in Chinese patent publication No. 02140222.1 dated Dec. 5, 2003.
Translation of "Notification of the First Office Action" in Chinese patent publication No. 02140222.1 dated Dec. 5, 2003.

* cited by examiner

Primary Examiner—Rafael Perez-Gutierrez
(74) Attorney, Agent, or Firm—Finnegan, Henderson, Farabow, Garrett & Dunner, L.L.P.

(57) ABSTRACT

A microphone is arranged on the first surface of a first housing, which opposes a second housing in a close state. A first speaker is arranged on the second surface of the second housing, which opposes the first surface in the close state. A second speaker is arranged on that surface of the first or second housing, which is exposed to the outside in the close state. A detector detects whether the first and second housings are in the close state. When communication is being executed, the state of the first speaker when the first and second housings are not in the close state is a valid state, and the close state is detected by the detector, a control section invalidates both the microphone and the first speaker and validates the second speaker.

2 Claims, 4 Drawing Sheets

MOBILE COMMUNICATION TERMINAL WITH CONTROL SECTION FOR ONE-WAY COMMUNICATION

CROSS-REFERENCE TO RELATED APPLICATIONS

This application is based upon and claims the benefit of priority from the prior Japanese Patent Application No. 2001-196455, filed Jun. 28, 2001, the entire contents of which are incorporated herein by reference.

BACKGROUND OF THE INVENTION

1. Field of the Invention

The present invention relates to a mobile communication terminal including two housings connected to each other.

2. Description of the Related Art

In a mobile communication terminal of this type, first and second housings are connected such that they can be set in the first state wherein they are open or in the second state wherein they are folded. A microphone is arranged in the first housing, and a receiver is arranged in the second housing. For this reason, the microphone and receiver are sometimes closer to each other in the second state than in the first state depending on the positions of the microphone and receiver.

In this case, if a mobile communication terminal in use is set in the second state, the voice output from the receiver is directly input to the microphone, resulting in howling.

In a conventional mobile communication terminal, when it is set in the second state during use, both the microphone and the receiver are set in a mute mode. Alternatively, voice communication itself is ended.

For this reason, even when the user wants to only listen to received voice, the mobile communication terminal must be kept set in the first state. This is inconvenient. The user wants to only listen to received voice, for example, when he uses an information distribution service such as a weather forecast service by voice or he listens to downloaded music during download.

BRIEF SUMMARY OF THE INVENTION

The present invention has been made in consideration of the above situation, and has as its object to provide a mobile communication terminal which can output received voice even when two housings are folded or slid closed without causing any howling.

According to an aspect of the present invention, there is provided a mobile communication terminal comprising a first housing, a second housing which is connected to the first housing so as to be able to set a close state and an open state together with the first housing, a microphone arranged on a first surface of the first housing, which opposes the second housing in the close state, a first speaker arranged on a second surface of the second housing, which opposes the first surface in the close state, a second speaker arranged on an outer surface of the first or second housing, which is exposed in the close state, a detector configured to detect whether the first and second housings are in the close state, and a control section configured to invalidate both the microphone and the first speaker and validate the second speaker when communication is being executed, when the first speaker is considered to be valid while the first and second housings are not in the close state and when the first and second housings are detected by the detector to be in the close state.

According to another aspect of the present invention, there is provided a mobile communication terminal comprising a first housing, a second housing which is connected to the first housing so as to be able to set a close state and an open state together with the first housing, a microphone arranged on a first surface of the first housing, which opposes the second housing in the close state, a first speaker arranged on a second surface of the second housing, which opposes the first surface in the close state, a second speaker arranged on an outer surface of the first or second housing, which is exposed in the close state, a detector configured to detect whether the first and second housings are in the close state, and a control section configured to invalidate the first speaker and validate the second speaker when communication is being executed, when the first speaker is considered to be valid while the first and second housings are not in the close state and when the first and second housings are detected by the detector to be in the close state.

Additional objects and advantages of the present invention will be set forth in the description which follows, and in part will be obvious from the description, or may be learned by practice of the present invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention, and together with the general description given above and the detailed description of the embodiments given below, serve to explain the principles of the present invention.

DETAILED DESCRIPTION OF THE INVENTION

An embodiment of the present invention will be described below with reference to the accompanying drawing.

Figure 1:
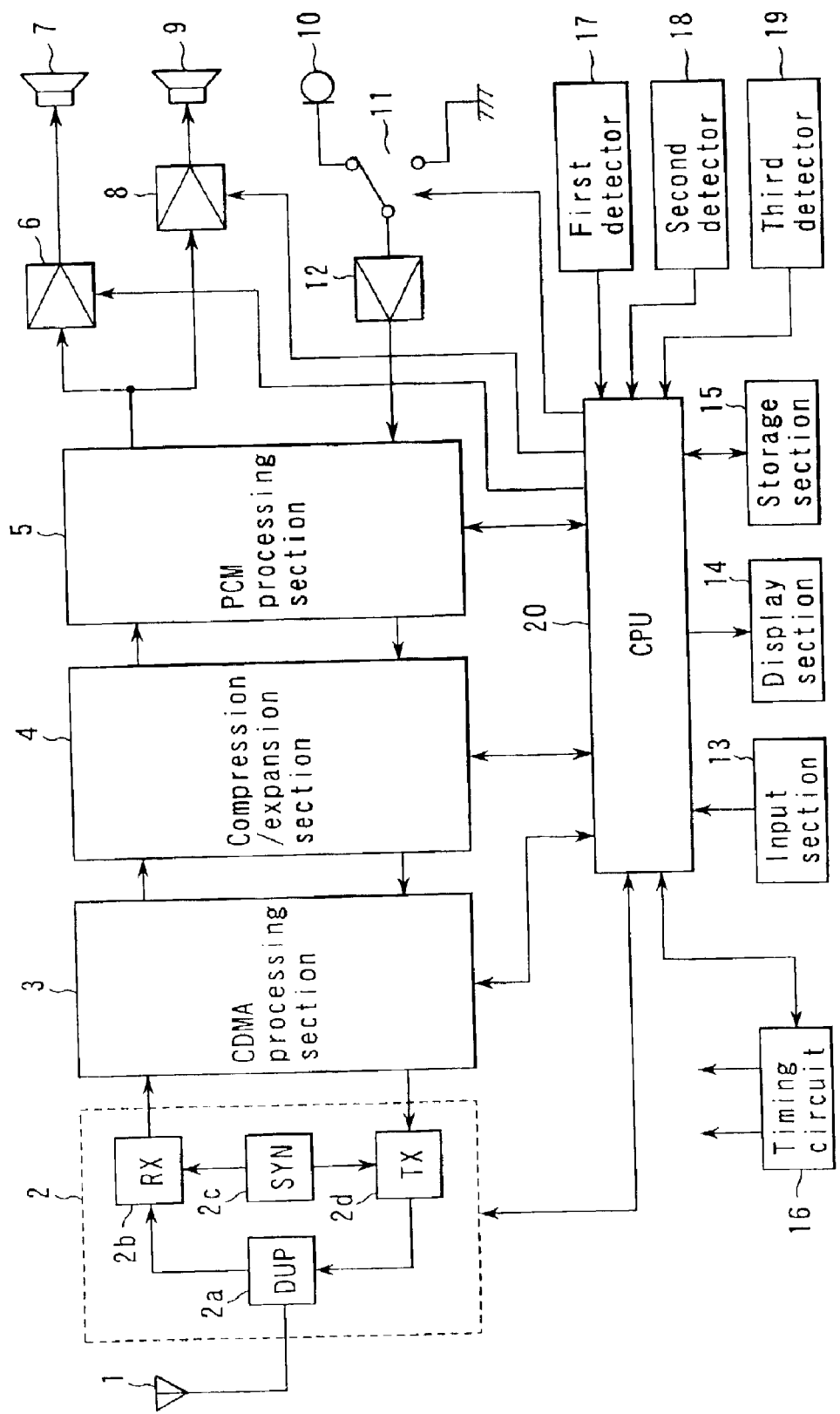
FIG. 1 is a block diagram of a mobile communication terminal according to an embodiment of the present invention.

FIG. 1 is a block diagram of a mobile communication terminal according to the embodiment;

As shown in FIG. 1, the mobile communication terminal of the embodiment includes an antenna 1, radio section 2, CDMA processing section 3, compression/expansion section 4, PCM processing section 5, receiver amplifier 6, receiver 7, speaker amplifier 8, speaker 9, microphone 10, switch 11, transmitter amplifier 12, input section 13, display section 14, storage section 15, timing circuit 16, first detector 17, second detector 18, third detector 19, and CPU 20. The radio section 2 includes a duplexer (DUP) 2a, receiving circuit (RX) 2b, frequency synthesizer (SYN) 2c, and transmitting circuit (TX) 2d.

A radio signal transmitted from a base station (not shown) is received by the antenna 1 and input to the radio section 2. In the radio section 2, the radio signal is input to the receiving circuit 2b through the duplexer 2a. The radio signal is mixed, by the receiving circuit 2b, with a reception local oscillation signal output from the frequency synthesizer 2c. Thus, the radio signal is frequency-converted into an intermediate frequency signal. The frequency of the reception local oscillation signal generated by the frequency synthesizer 2c is set by a control signal output from the CPU 20.

The intermediate frequency signal is input to the CDMA processing section 3. The CDMA processing section 3 despreads the intermediate frequency signal using a spreading code assigned to the reception channel. The CDMA processing section 3 executes quadrature demodulation corresponding to, e.g., QPSK (Quadrature Phase Shift Keying), thereby obtaining demodulated data having a predetermined format corresponding to the data rate. The CDMA processing section 3 supplies the demodulated data to the compression/expansion section 4.

For the demodulated data output from the CDMA processing section 3, the compression/expansion section 4 executes expansion processing corresponding to the received data rate supplied from the CPU 20. The compression/expansion section 4 also executes decoding processing using Viterbi decoding and error correcting decoding processing to reconstruct baseband voice data or packet data. The compression/expansion section 4 supplies voice data to the PCM processing section 5 or the packet data to the CPU 20.

The PCM processing section 5 PCM-decodes the digital voice data output from the compression/expansion section 4 to obtain an analog voice signal. The voice signal is amplified by the receiver amplifier 6 and output from the receiver 7 as voice. Alternatively, the voice signal is amplified by the speaker amplifier 8 and output from the speaker 9 as loud voice. The operations of the receiver amplifier 6 and speaker amplifier 8 are individually turned on/off under the control of the CPU 20.

The voice of the speaking person is converted into a voice signal by the microphone 10. This voice signal is input to the transmitter amplifier 12 through the switch 11. The switch 11 is set in a state wherein the microphone 10 is connected to the input of the transmitter amplifier 12 or in a state wherein the input of the transmitter amplifier 12 is grounded under the control of the CPU 20. The voice signal is amplified to an appropriate level by the transmitter amplifier 12 and supplied to the PCM processing section 5.

The PCM processing section 5 executes PCM encoding processing for the voice signal to obtain digital voice data. The PCM processing section 5 supplies the voice data to the compression/expansion section 4. Packet data generated by the CPU 20 is supplied from the CPU 20 to the compression/expansion section 4.

The compression/expansion section 4 detects the energy of the voice data and determines a data rate on the basis of the detection result. The compression/expansion section 4 compresses the voice data into a signal having a format corresponding to the data rate. The compression/expansion section 4 also executes error correcting coding processing by, e.g., convolutional encoding for the voice data and supplies it to the CDMA processing section 3. In transmitting packet data, the compression/expansion section 4 executes error correcting coding processing for the packet data output from the CPU 20 and outputs the data to the CDMA processing section 3.

The CDMA processing section 3 modulates the carrier wave signal by the transmission data supplied from the compression/expansion section 4. For example, QPSK is used for this modulation. The CDMA processing section 3 executes spread spectrum processing for the modulated carrier wave signal using a PN code assigned to each transmission channel, thereby obtaining a transmission signal. The CDMA processing section 3 supplies the transmission signal to the transmitting circuit 2d of the radio section 2.

The transmitting circuit 2d combines the transmission signal with a transmission local oscillation signal generated by the frequency synthesizer 2c, thereby converting the transmission signal into a radio frequency signal. The transmitting circuit 2d RF-amplifies only the effective portion of the radio frequency signal on the basis of a transmission data rate supplied from the CPU 20 and outputs the radio frequency signal. The radio frequency signal output from the transmitting circuit 2d is supplied to the antenna 1 through the duplexer 2a and transmitted from the antenna 1 to a base station (not shown).

The input section 13 includes keys including a dial key, calling key, power key, and end key. The input section 13 inputs a user instruction by pressing these keys. The display section 14 includes an LCD (Liquid Crystal Display), LED (Light Emitting Diode), and the like. The display section 14 displays, by the LCD and LED, information to be supplied to the user under the control of the CPU 20.

The storage section 15 is formed by appropriately using, e.g. a ROM, DRAM (Dynamic RAM), and SRAM (Static RAM). The storage section 15 stores an operation program for the CPU 20. The storage section 15 also stores various kinds of setting information, various kinds of received data, and various kinds of data generated in the device.

The timing circuit 16 generates a reference clock at a predetermined rate. The timing circuit 16 supplies the reference clock to circuit portions represented by the CPU 20 in the terminal, which require an operation clock.

The first detector 17 detects whether the housings are folded. The first detector 17 notifies the CPU 20 of the detection result.

The second detector 18 detects whether an earphone is attached to a terminal (not shown). The second detector 18 notifies the CPU 20 of the detection result.

The third detector 19 detects whether a hands-free device is attached to a terminal (not shown). The third detector 19 notifies the CPU 20 of the detection result.

The CPU 20 controls the sections by software processing based on the operation program stored in the storage section 15, thereby realizing operation as a mobile communication terminal. The CPU 20 also executes data processing to realize an e-mail transmitting/receiving function or a browser function for Internet access. The CPU 20 operates as a control section and setting section.

When a predetermined condition is satisfied, the control section executes control to forcibly invalidate the receiver 7 and microphone 10 and validate the speaker 9.

The setting section sets in accordance with a user designation whether control by the control section is to be validated.

Figure 2:
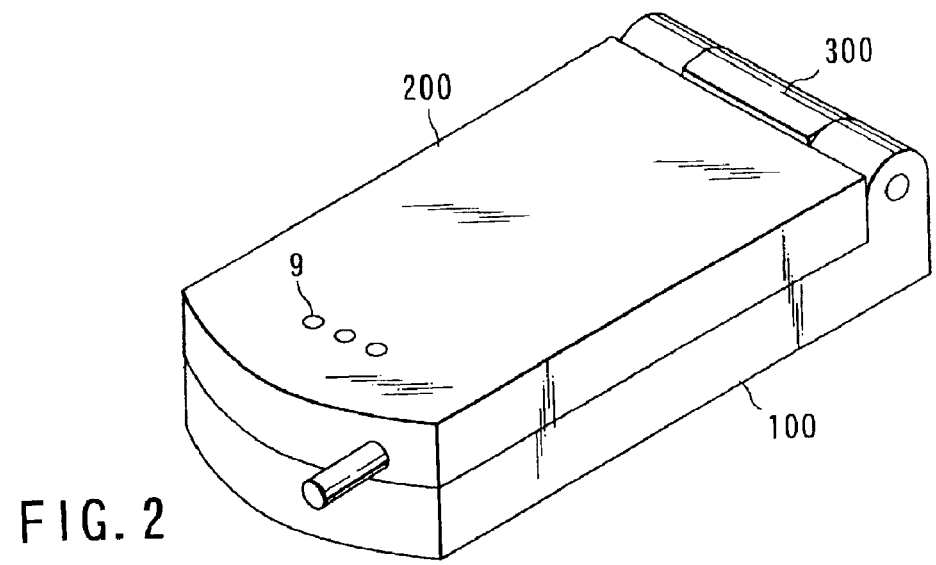
FIG. 2 is a perspective view showing an outer appearance of the mobile communication terminal according to the embodiment of the present invention when the mobile communication terminal is folded.
Figure 3:
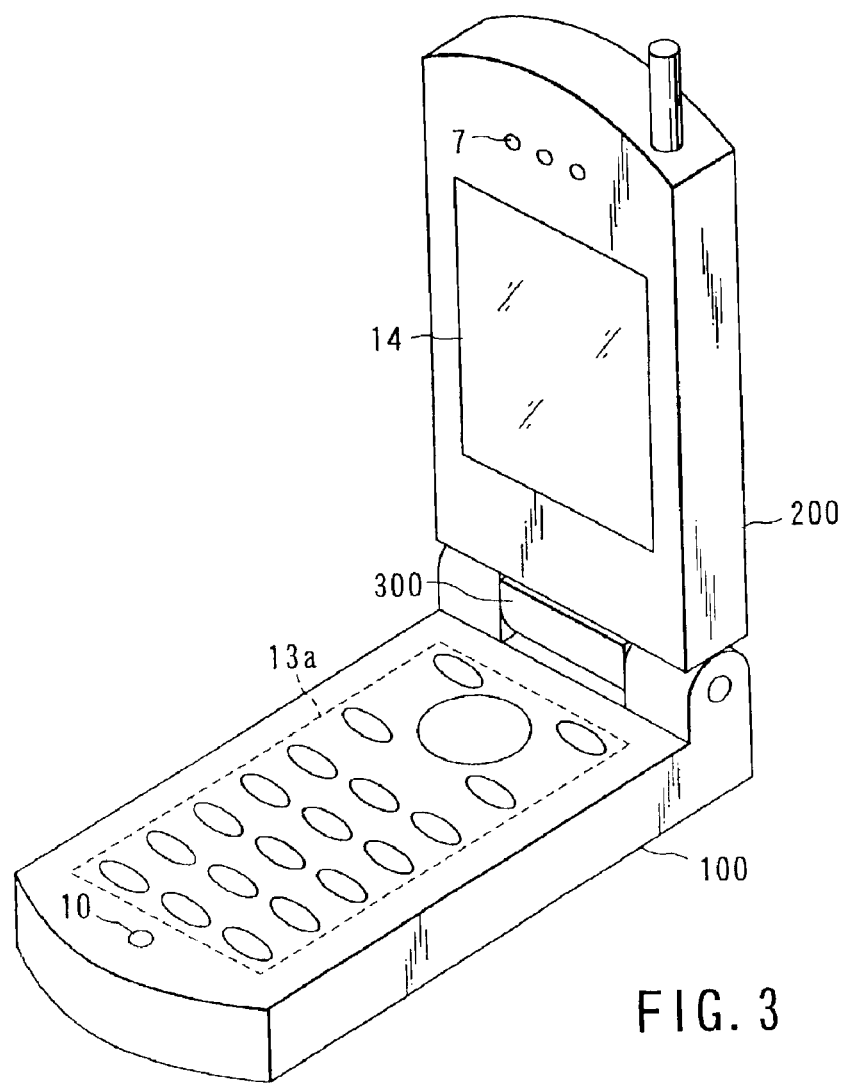
FIG. 3 is a perspective view showing an outer appearance of the mobile communication terminal according to the embodiment of the present invention when the mobile communication terminal is open.

FIGS. 2 and 3 are perspective views showing outer appearances of the mobile communication terminal according to this embodiment. FIG. 2 shows a folded state, and FIG. 3 shows an open state. The same reference numerals as in FIG. 1 denote the same parts in FIGS. 2 and 3, and a detailed description thereof will be omitted.

As shown in FIGS. 2 and 3, the mobile communication terminal of the embodiment has a lower housing 100 and upper housing 200. The lower housing 100 and upper housing 200 are connected by a hinge 300. The mobile communication terminal has a folding structure so that the mobile communication terminal can be set in the folded state shown in FIG. 2 or in the open state shown in FIG. 3.

The microphone 10 is arranged on that surface (first surface) of the lower housing 100, which comes to the inside in the folded state. The receiver 7 is arranged on that surface (second surface) of the upper housing 200, which comes to the inside in the folded state. The speaker 9 is arranged on that surface (third surface) of the upper housing 200, which comes to the outside in the folded state. The receiver 7 and microphone 10 oppose each other in the folded state.

In addition to the microphone 10, a main operation section 13a including most operation keys of the input section 13 is mounted on the first surface of the lower housing 100. In addition to the receiver 7, the display section 14 is mounted on the second surface of the upper housing 200.

An operation of the mobile communication terminal so configured will now be described. Characteristic operation related to the gist of the present invention will be described here in detail.

Figure 4:
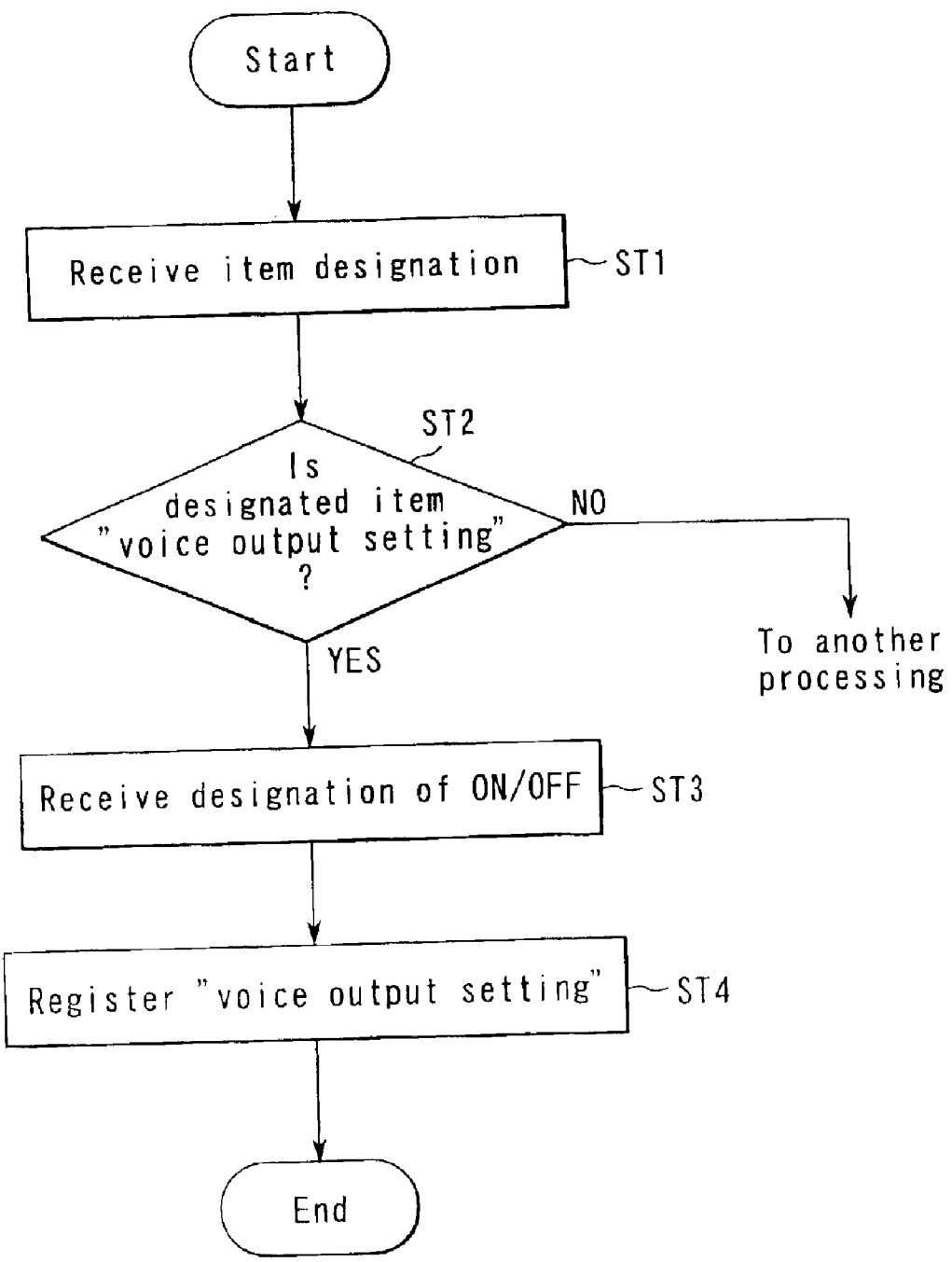
FIG. 4 is a flow chart of menu operation reception processing.

In a predetermined state such as a standby state, when the user instructs to execute menu operation by predetermined instruction operation on the input section 13, the CPU 20 receives this instruction and executes menu operation reception processing shown in FIG. 4.

In step ST1, the CPU 20 receives a user's designation on an item in the menu. In step ST2, the CPU 20 confirms whether the designated item is "voice output setting". The item "voice output setting" sets whether the voice output form is to be switched when the housings are folded under a predetermined condition.

If NO in step ST2, the CPU 20 advances to processing corresponding to the designated item. However, if YES in step ST2, the CPU 20 receives, in step ST3, a user's designation whether switching of the voice output form is to be turned on or off. In step ST4, the CPU 20 registers the ON/OFF designation content as "voice output setting" and ends the menu operation reception processing.

Figure 5:
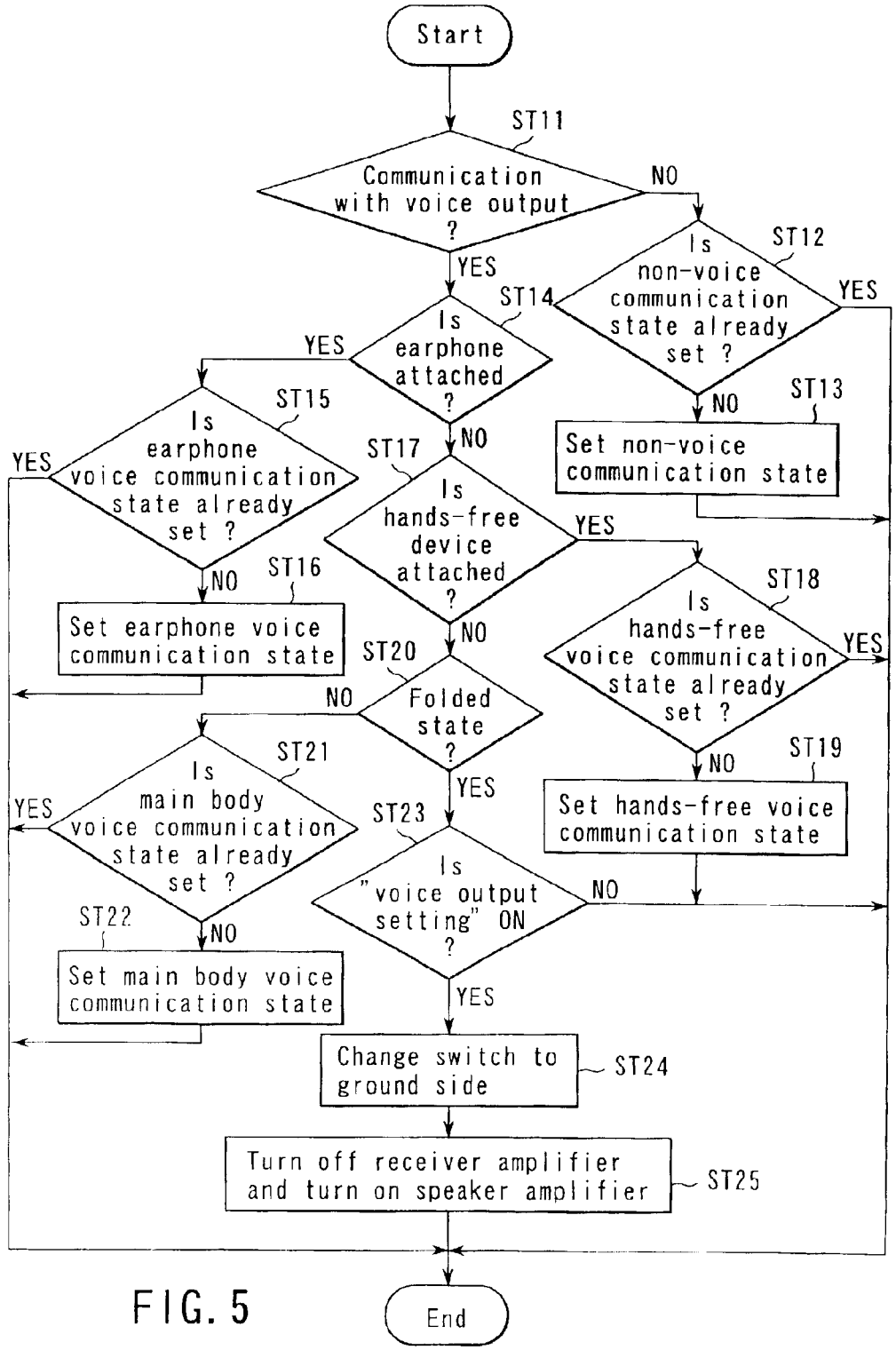
FIG. 5 is a flow chart of voice communication state setting processing.

Upon talking, the CPU 20 executes voice communication state setting processing shown in FIG. 5 at a predetermined timing, e.g., at a predetermined interval.

In step ST11, the CPU 20 confirms whether communication which is being executed is communication with voice output.

If data such as email or image data without any voice output is being downloaded, i.e., NO in step ST11, the CPU 20 confirms in step ST12 whether a non-voice communication state (to be described later) is already set. If NO in step ST12, the CPU 20 sets the non-voice communication state in step ST13 and ends the voice communication state setting processing. If YES in step ST12, the CPU 20 ends the voice communication state setting processing without any processing, i.e., while maintaining the non-voice communication state. In this way, the non-voice communication state is set when communication without any voice output is being executed. In the non-voice communication state, the CPU 20 powers off both the receiver amplifier 6 and speaker amplifier 8 to stop outputting voice. In addition, the CPU 20 changes the switch 11 to the ground side to set a mute mode for transmission voice. Hence, in this state, the receiver 7, speaker 9, and microphone 10 are invalid.

When YES in step ST11, the CPU 20 confirms in step ST14 on the basis of the detection result from the second detector 18 whether an earphone is attached. If YES in step ST14, the CPU 20 confirms in step ST15 whether an earphone voice communication state (to be described later) is already set. If NO in step ST15, the CPU 20 sets the earphone voice communication state in step ST16 and ends the voice communication state setting processing. If YES in step ST15, the CPU 20 ends the voice communication state setting processing without any processing, i.e., while maintaining the earphone voice communication state. In this manner, when communication with voice output is being executed, and an earphone is attached, the earphone voice communication state is set. In the earphone voice communication state, the CPU 20 powers off both the receiver amplifier 6 and the speaker amplifier 8 to make the earphone output voice. Hence, in this state, the receiver 7 and speaker 9 are invalid.

If NO in step ST14, the CPU 20 confirms in step ST17 on the basis of the detection result from the third detector 19 whether a hands-free device is attached. If YES in step ST17, the CPU 20 confirms in step ST18 whether a hands-free voice communication state (to be described later) is already set. If NO in step ST18, the CPU 20 sets the hands-free voice communication state in step ST19 and ends the voice communication state setting processing. If YES in step ST18, the CPU 20 ends the voice communication state setting processing without any processing, i.e., while maintaining the hands-free voice communication state. In this manner, when communication with voice output is being executed, and a hands-free device is attached, the hands-free voice communication state is set. In the hands-free voice communication state, the CPU 20 powers off both the receiver amplifier 6 and the speaker amplifier 8 and changes the switch 11 to the ground side to make the hands-free device input/output voice. Hence, in this state, the receiver 7, speaker 9, and microphone 10 are invalid.

As described above, when any one of the non-voice communication state, earphone voice communication state, and hands-free voice communication state is set, it is not confirmed whether the folded state is set. Either in the open state or in the folded state, the set state is maintained. In the non-voice communication state, earphone voice communication state, and hands-free voice communication state, the receiver 7 is invalid. When the receiver 7 is invalidated in advance, the voice communication state is not changed independently of whether the folded state is set.

If NO in step ST17, the CPU 20 confirms in step ST20 on the basis of the detection result from the first detector 17 whether the folded state is set. If NO in step ST20, the CPU 20 confirms in step ST21 whether a main body voice communication state (to be described later) is already set. If NO in step ST21, the CPU 20 sets the main body voice communication state in step ST22 and ends the voice communication state setting processing. If YES in step ST21, the CPU 20 ends the voice communication state setting processing without any processing, i.e., while maintaining the main body voice communication state. In this way, when communication with voice output is being executed, neither an earphone nor a hands-free device is attached, and the folded state is not set, the main body voice communication state is set. In the main body voice communication state, the CPU 20 powers on the receiver amplifier 6, powers off the speaker amplifier 8, and changes the switch 11 to the microphone 10 side. Hence, in this state, the receiver 7 and microphone 10 are valid.

As described above, assume a state wherein the terminal is in use, and the receiver 7 and microphone 10 are valid. When the lower housing 100 and upper housing 200 are folded in this state, the CPU 20 immediately confirms the folded state in step ST20. In this case, the CPU 20 confirms in step ST23 whether "voice output setting" is ON. If YES in step ST23, the CPU 20 changes the switch 11 to the ground side to set the mute mode for transmission voice in step ST24. In step ST25, the CPU 20 powers off the receiver amplifier 6, powers on the speaker amplifier 8, and ends the voice communication state setting processing. That is, as far as "voice output setting" is set ON, even when communication is in progress, and the receiver 7 and microphone 10 are valid, they are forcibly invalidated upon confirming the folded state. The output of received voice is switched to the speaker 9. If NO in step ST23, the CPU 20 ends the voice communication state setting processing without any processing, i.e., while maintaining the voice communication state set until that time.

As described above, according to this embodiment, in a voice communication state using the receiver 7 and microphone 10, when the lower housing 100 and upper housing 200 are folded, driving the receiver 7 by the receiver amplifier 6 is stopped, and outgoing voice is set in the mute mode by the switch 11, thereby forcibly invalidating the receiver 7 and microphone 10. For this reason, even when the lower housing 100 and upper housing 200 are folded to make the receiver 7 and microphone 10 oppose each other, no howling occurs. Received voice is output from the speaker 9 exposed on the outside in the folded state. As a result, the user can listen to received voice while keeping the mobile communication terminal folded.

According to this embodiment, when the mobile communication terminal is folded in use, loud voice output from the speaker 9 is forcibly started. Even when the user erroneously has folded the mobile communication terminal during voice communication, loud voice is output from the speaker 9. In this case, people around the user may listen to the received voice against user's will. In this embodiment, however, the above-described forcible start of loud voice output from the speaker 9 can be inhibited by turning off "voice output setting". Hence, if the user does not want people around him to listen to received voice, erroneous loud voice output of received voice can be reliably prevented by turning off "voice output setting".

The present invention is not limited to the above embodiment. For example, if the level of a roundabout sound component, which is output from the speaker 9 and input to the microphone 10, can be suppressed relatively low, the microphone 10 need not always be forcibly invalidated.

"Voice output setting" may be omitted. Instead, when a predetermined condition is satisfied, the receiver 7 and microphone 10 may always be forcibly invalidated, and loud voice output of received voice from the speaker 9 may always be done.

For example, only in a communication state wherein only reception of a forward link signal is done, as in a data downloading state, the receiver 7 and microphone 10 may be forcibly invalidated, and loud voice output of received voice from the speaker 9 may be done. With this arrangement, erroneous loud voice output of received voice of voice communication can be prevented.

In the above embodiment, the receiver 7 is invalidated when communication without any voice output is being executed, an earphone is attached, or a hands-free device is attached. However, the mobile communication terminal need not always cope with all these states or may cope with another state.

To invalidate the microphone 10, any other technique of, e.g., only disconnecting the microphone 10 from the transmitter amplifier 12, powering off the transmitter amplifier 12, or reducing the gain of the transmitter amplifier 12 may be employed.

To invalidate the receiver 7, any other technique of, e.g., grounding the input of the receiver 7, disconnecting the receiver amplifier 6 from the receiver 7, or reducing the gain of the receiver amplifier 6 may be employed.

The speaker 9 may be arranged on the outer surface of the lower housing 100 in the folded state.

In the above embodiment, the receiver 7 and microphone 10 are so arranged that they oppose each other in the folded state. However, the present invention can also be applied to an arrangement in which the receiver 7 and microphone 10 are shifted from each other in position.

In the above embodiment, the mobile communication terminal of the present invention is applied to the CDMA scheme. However, an arbitrary communication scheme can be used.

The lower and upper housings 100 and 200 may have any other connection; they may be slid open or closed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile communication terminal comprising:

a first housing;

a second housing connected to the first housing so as to be able to set a close state and an open state together with the first housing;

a microphone arranged on a first surface of the first housing, which opposes the second housing in the close state;

a first speaker arranged on a second surface of the second housing, which opposes the first surface in the close state;

a second speaker arranged on an outer surface of the first or second housing, which is exposed in the close state;

a detector configured to detect whether the first and second housings are in the close state; and a control section configured to perform a control operation when the detector detects that the first and second housings have been set from the open state to the close state, the control operation: (i) invalidating both the microphone and the first speaker; and either (ii) validating the second speaker when a communication being executed is a one-way communication which is limited to a reception of a forward link signal; or (iii) invalidating the second speaker when the communication being executed is not the one-way communication.

2. A mobile communication terminal comprising:

a first housing;

a second housing connected to the first housing so as to be able to set a close state and an open state together with the first housing;

a microphone arranged on a first surface of the first housing, which opposes the second housing in the close state;

a first speaker arranged on a second surface of the second housing, which opposes the first surface in the close state;

a second speaker arranged on an outer surface of the first or second housing, which is exposed in the close state;

a detector configured to detect whether the first and second housings are in the close state; and a control section configured to perform a control operation when the detector detects that the first and second housings have been set from the open state to the close state, the control operation: (i) invalidating the first speaker; and either (ii) validating the second speaker when a communication being executed is a one-way communication which is limited to a reception of a forward link signal; or (iii) invalidating the second speaker when the communication being executed is not the one-way communication.

* * * * *